United States Patent [19]

Pryor et al.

[11] Patent Number: 5,652,575

[45] Date of Patent: Jul. 29, 1997

[54] MAINTENANCE TERMINATION UNIT FOR TELEPHONE CIRCUITS

[75] Inventors: Dennis Malcolm Pryor; Michael Challis, both of Swindon, England

[73] Assignee: Raychem Limited, Swindon, United Kingdom

[21] Appl. No.: 360,756

[22] PCT Filed: Jun. 30, 1993

[86] PCT No.: PCT/GB93/01376

§ 371 Date: Dec. 21, 1994

§ 102(e) Date: Dec. 21, 1994

[87] PCT Pub. No.: WO94/01961

PCT Pub. Date: Jan. 20, 1994

[30] Foreign Application Priority Data

Jul. 1, 1992 [GB] United Kingdom .................... 9213980
Oct. 12, 1992 [GB] United Kingdom .................... 9221348

[51] Int. Cl.$^6$ ........................................ H04B 3/46
[52] U.S. Cl. .................... 340/825.77; 379/27; 379/29
[58] Field of Search .................... 340/825.77; 379/26, 379/27, 29

[56] References Cited

U.S. PATENT DOCUMENTS

| | | | |
|---|---|---|---|
| 3,725,613 | 4/1973 | Allen et al. | 179/175.3 |
| 4,143,250 | 3/1979 | Simokat | 179/175.3 R |
| 4,489,221 | 12/1984 | Walker et al. | 179/19 |
| 4,529,847 | 7/1985 | DeBalko | 379/29 |
| 4,582,960 | 4/1986 | DeLuca et al. | 179/98 |
| 4,626,632 | 12/1986 | Mazz | 379/29 |

(List continued on next page.)

FOREIGN PATENT DOCUMENTS

| | | | |
|---|---|---|---|
| 0291169 | 11/1988 | European Pat. Off. | H04M 3/18 |
| 3513598 | 12/1987 | Germany | H04M 3/30 |
| 2030820 | 4/1980 | United Kingdom | H04B 3/46 |
| 2149274 | 6/1985 | United Kingdom | H04M 3/22 |

(List continued on next page.)

OTHER PUBLICATIONS

*Patent Abstracts of Japan*, vol. 15, No. 495 (P–1288), Dec. 13, 1991 (abstract for Japanese Application No. 3–214067, Murata Manufacturing Co. Ltd., Sep. 19, 1991.
Search Report for British Application No. 9213992.2, filed Jul. 1, 1992.
Search Report for International Application No. PCT/GB93/01371. No date.
Search Report for International Application No. PCT/GB93/01376. No date.
Tamio Motomitsu et al, "Development of Centralized Looptesting System for Subscriber Loops", *NTT Review*, vol. 3, No. 1, Jan. 1991, pp. 117–121.

*Primary Examiner*—Michael Horabik
*Assistant Examiner*—William H. Wilson, Jr.
*Attorney, Agent, or Firm*—Herbert G. Burkard; Marguerite E. Gerstner; Bruce M. Bertram

[57] ABSTRACT

A maintenance termination unit (MTU) for use in telephone circuits. The MTU comprises a switching arrangement which can be connected between sets of terminal equipment in a communications channel comprising a pair of lines. The switching arrangement comprises: a DC voltage window detector circuit which, in use, is connected between the lines and is responsive to a voltage between the lines; and series switching circuits, which, in use, are connected in the lines. The arrangement may also include a shunt switching circuit, which, in use, is connected between the lines. The arrangement includes low pass filters associated with the switching circuits. The DC voltage window detector circuit will actuate the switching circuits when the DC voltage between the lines is within respective predetermined bands, but will not actuate the switching circuits when the DC voltage between the lines is not within the respective predetermined bands. The switching circuits can be remotely actuated by means of a DC signal on the channel. The low pass filters have a cut-off frequency which is sufficiently low to prevent the switching circuits from being actuated by a ringing signal on the channel.

16 Claims, 7 Drawing Sheets

U.S. PATENT DOCUMENTS

| | | | |
|---|---|---|---|
| 4,653,084 | 3/1987 | Ahuja | 379/29 |
| 4,700,380 | 10/1987 | Ahuja | 379/26 X |
| 4,710,949 | 12/1987 | Ahuja | 379/26 |
| 4,807,277 | 2/1989 | Perry | 379/102 |
| 4,875,040 | 10/1989 | Dzjuban et al. | 340/825.77 X |
| 5,353,327 | 10/1994 | Adari et al. | 379/22 |
| 5,357,556 | 10/1994 | Dresser | 379/27 |

FOREIGN PATENT DOCUMENTS

| | | | |
|---|---|---|---|
| 2181625 | 4/1987 | United Kingdom | H04B 3/46 |
| 2263211 | 7/1993 | United Kingdom | H04B 3/46 |
| WO92/07402 | 4/1992 | WIPO | H02H 3/02 |
| WO92/10878 | 6/1992 | WIPO | H03K 17/08 |
| WO93/01639 | 1/1993 | WIPO | H02H 3/087 |

0
MAINTENANCE TERMINATION UNIT FOR TELEPHONE CIRCUITS

BACKGROUND OF THE INVENTION

1. Field of the Invention

This invention relates to communications circuits, and especially to maintenance termination units for use in telephone circuits.

2. Introduction to the Invention

In recent years, and especially in view of deregulation of many telephone systems, privately owned communication equipment has increasingly been installed in the premises of subscribers to the system, with the result that it is often necessary to determine whether any fault is located in the telephone line, or in the subscriber's premises, i.e. in the subscriber's equipment or cabling, in order to determine whose responsibility it is to repair the fault. It is highly advantageous economically if this determination can be performed remotely by sending an appropriate signal from the local exchange along the line, thereby obviating the necessity to send any telephone company personnel to the subscriber's premises.

In order to test the telephone line for any faults it is necessary firstly to install a so-called "maintenance termination unit" or MTU in the line at the subscriber's premises which can disconnect the subscriber equipment from the line (often called sectionalizing the line) and connect the a and b or tip and ring lines on receipt of the appropriate signals from the exchange. During the line testing procedure determinations will typically be made of the line to line resistance and of the first and second line to ground resistance. Also the line continuity can be determined by detecting the presence of the MTU electronically.

Various forms of MTU are described in the prior art, and may employ solid state (silicon) switches or electrical relays. The present invention is concerned with solid state switching devices in view of their greater reliability and lower cost as compared with arrangements that incorporate relays. A number of such devices are described, for example, in U.S. Pat. No. 4,710,949 to Om Ahuja. This device comprises a pair of voltage sensitive switches, one located in each of the tip and ring lines, and a distinctive termination connecting the tip and ring lines on the subscriber side of the voltage-sensitive switches. The voltage-sensitive switches may each have a threshold voltage of about 16 volts so that they are closed in normal operation by the 48 volt battery voltage but will open when this is replaced by a test voltage below about 32 volts in order to test the line-to-ground and tip-to-ring impedances. The distinctive termination may, for example, comprise a back-to-back diode and Zener diode which will exhibit an asymmetric resistance when large voltages (higher than the operating voltages) of different polarity are applied.

Although this form of MTU will perform adequately to sectionalize a fault in a line, it suffers from the problem that it requires the provision of ringing bypass capacitors in the signal path in parallel with the voltage-sensitive switches. These capacitors are necessary because the amplitude of the ringing signal (about 80 V RMS) which is superimposed on the 48 V DC battery voltage, is sufficiently large for the polarity of the resultant signal to change during the ringing signal cycles and to cause unacceptably large crossover distortion due to opening of the voltage-sensitive switches at the crossover points of the ringing signal. Because the ringing frequency is relatively low, about 20 Hz, a large capacitance is required for the ringing bypass capacitors, typically in the order of 10 µF. Because the capacitors are connected in the signal line they need to have a high voltage rating in order to withstand normal electrical transients, etc, which increases their cost and physical size. In addition they can provide a low impedance path for transients.

SUMMARY OF THE INVENTION

According to the present invention, there is provided a switching arrangement that can be connected in a communications channel that comprises a pair of lines between sets of terminal equipment, for example between a subscriber and an exchange, which comprises:
(i) a DC voltage window detector circuit (referred to herein as a window detector circuit or simply as a window circuit) that is connected between the lines and is responsive to the voltage between the lines; and
(ii) one or more switching circuits connected in or between the lines that can be actuated by the window detector circuit when, and only when, the voltage between the lines is within a predetermined band, so that the or each switching circuit can be remotely actuated by means of a DC signal on the line, the arrangement including a low pass filter associated with the or each switching circuit having a cut-off frequency that is sufficiently low to prevent the switching circuit(s) being actuated by a ringing signal on the channel.

Normally the window detector circuit will allow current to flow through it only when the line voltage is within a predetermined band (which will be above normal signaling voltages), i.e. the current that flows through the window circuit is significantly greater when the line voltage is within the band than when it is outside the band, although at very high applied line voltages the leakage current through the window circuit may approach or even exceed the within-band current flow. Thus, according to a preferred aspect the invention provides a switching arrangement that can be connected in a communications channel that comprises a pair of lines between sets of terminal equipment, for example between a subscriber and an exchange, which comprises:
(i) a DC voltage window detector circuit that is connected between the lines and which will allow a current to flow through it when, and only when, the voltage between the lines is within a predetermined band; and
(ii) one or more switching circuits connected in or between the lines that can be actuated by the current flow in the window detector circuit so that the or each switching circuit can be remotely actuated by means of a DC signal on the line, the arrangement including a low pass filter associated with the or each switching circuit having a cut-off frequency that is sufficiently low to prevent the switching circuit(s) being actuated by a ringing signal on the channel.

DETAILED DESCRIPTION OF THE INVENTION

The arrangement according to the present invention has the advantage that it can be actuated by a signal of amplitude between that of the normal communications signals and the ringing signal without the ringing signal triggering the switch or switches and without the need to employ ringing bypass capacitors in the lines. The distortion of the ringing signal is reduced by use of overcurrent switching circuits as the series switches. The circuits employed in the arrangement according to the invention can switch on to their conductive state with applied voltages as low as one p-n junction drop (0.6 V) which, combined with the voltage drop across any diode bridges present, will cause a crossover distortion of less than about 2 volts in the ringing signal, in contrast with one of about 32 volts caused by the voltage sensitive switches in the absence of ringing bypass capacitors.

As switching circuits the arrangement may employ a series switching circuit connected in each of the lines of the channel and/or one or more shunt switching circuits connected between the lines, or, in the case of systems having an earth, between the lines and earth.

Since the test voltage that is applied to the arrangement in order to open the series switching circuits and close the shunt switching circuit will normally be significantly less than the peak voltage applied during ringing, the switching circuits would attempt to switch during that period in the ringing cycle that the applied voltage is within the predetermined band. Such switching can be prevented by including a low pass filter in the arrangement with a sufficiently low cut-off frequency. The required cut-off frequency will depend on the width of the voltage band within which current will flow in the window circuit; the narrower the band is, the higher the cut-off frequency may be, since the applied voltage will spend less time within the predetermined band during each cycle. For example, a voltage band of 20 V will correspond to a cut-off frequency of approximately 300 Hz.

The window detector circuit that determines the applied voltage at which the switches will open and close may include a Zener diode that sets the lower limit of the applied voltage that will cause current to flow. The upper limit of the applied voltage may conveniently be set by means of an overcurrent switching circuit that will open when the current passing through the circuit, and hence the voltage applied across it, exceeds a predetermined value. When the applied voltage is within this hand the window circuit will send a signal of some sort to the switching circuits.

It will normally be desirable for the shunt switching circuit to be capable of being switched independently of the series switching circuits. For example, the shunt switching circuit will need to be closed during a loop-back test to determine the line continuity (in which case it does not strictly matter whether the series switching circuits are open or closed), while the shunt switching circuit and the series switching circuits will all need to be open in order to determine the line insulation resistance (tip to ring resistance etc.). Independent actuation of the switches may be achieved for example by altering the polarity of the applied DC signal in order to actuate different switches. In this case the signal inputs for the shunt and series switching circuits may be connected to different lines in the window circuit, in each of which current is constrained to flow only when the DC actuating signal has the correct polarity.

There is no constraint on where the upper and lower limits of the predetermined voltage band of the window circuit may be other than that its lower limit should be higher than the maximum signal voltage, and it is possible for different arrangements to have different voltage windows. Preferably, however, the voltage band should not be set at such a high voltage that it requires any different level of skill on the part of anyone required to maintain the telephone equipment, and most preferably the voltage band is below the peak value of the ringing voltage so that the required voltage is no more dangerous than the normal ringing voltage.

In addition to the ability of the arrangement to be operated in order to locate a fault in the channel, it is possible according to a preferred aspect of the invention, for the circuits to be capable of protecting the system from overcurrents and overvoltages by opening and closing respectively. This can be achieved by employing the switches described below.

The series switching circuit in each of the lines is a solid state switch, normally formed in silicon, and preferably comprises a switching transistor whose input voltage is controlled by an overcurrent control element which switches on when the switching circuit is subjected to an overcurrent, thereby turning the switching transistor off. Such a circuit on its own will only switch in response to an overcurrent in its associated line. However, the circuit includes a test control element that also controls the input voltage of the switching transistor. The test control element turns on when current flows in the window circuit, thereby turning the switching transistor off. Thus, in this way the series switching circuits can be actuated either remotely or by an overcurrent in the line. The control elements may be formed from any of a number of devices, and the choice of control element will depend to some extent on the type of switching transistor employed. The overcurrent control element may, for example comprise a transistor whose base or gate is held in a potential divider that spans the switching transistor so that the base-emitter or gate-source voltage increases as the current in the line increases. Alternatively the control element may comprise a comparator that compares a fraction of the voltage across the switching transistor with a reference voltage and opens the switch if the fraction is greater than the reference voltage, as described in our copending international application No. PCT/GB91/02215. If a normally-on FET such as a JFET or a depletion mode MOSFET is employed as the switching transistor, a negative voltage generator, e.g. a charge pump, or an optocoupler may be employed as the control element, as described in our copending British application No. 9114717.3. The disclosures of these specifications are incorporated herein by reference.

Each series switching circuit is preferably capable of remaining open for a period of time after termination of the actuating D.C signal in order to be able to perform one or more tests on the line without the need to maintain the DC signal or while the polarity of the signal is reversed. For example, the circuit may remain open for up to 1 minute, but more usually for up to 20 to 40 seconds, and usually for at least 5 seconds. In the circuit described above, this may be achieved by including a capacitor between the base and emitter terminals or gate and source terminals of the test control element. The capacitor is charged up during actuation of the switching circuits by the D.C signal, and holds the test control element on and hence the switching transistor off, for a period of time after actuation by the D.C signal.

The series switching circuits may employ bipolar transistors and/or field effect transistors. Where bipoplar transistors are used they are preferably used in a darlington configuration as the switching transistor in order to reduce the base current required when the transistor is switched on. The base current must be supplied via a resistor connected between the base and collector of the switching transistor. When the circuit switches to its blocking or open state the switching transistor base current is diverted through the control transistor (which is now on) and becomes a leakage current. However, since the voltage drop across the resistor is much higher when the arrangement is in its blocking state, the leakage current is larger than the switching transistor base current. If a darlington pair or triplet is employed the effective DC current gain will be increased considerably so that a much higher resistance can be used.

Where field effect transistors are employed, MOSFETS are preferred, for example enhancement mode MOSFETs although depletion mode MOSFETs, may be employed, particularly where linearity is important. Examples of depletion mode MOSFET switches are described in our copending British patent application No. 9114717.3, mentioned above. The resistors employed in the switching circuit may be provided by MOSFETs, for example with their gates and drains connected as in NMOS logic. Alternatively, the control transistor and the resistor which together form the voltage divider for the base and gate of the switching transistor may be provided by a complementary n-channel and p-channel pair of FETs connected in the manner of CMOS logic.

It is preferred for the series switching circuits to include no resistive components in series with the switching transistor. Such an arrangement reduces the voltage drop or insertion loss along the line of circuit, and in addition, reduces the area of silicon that need be employed in an integrated circuit design of the arrangement.

The shunt switching circuit will normally comprise a triac connected between the tip and ring lines. The gate of the triac will be connected to one of the lines via a pair of back-to-back Zener diodes so that an overvoltage greater than the Zener breakdown voltage will cause a current pulse to be applied to the triac gate and cause the triac to operate. In addition the gate of the triac may be connected to the window circuit so the current flowing in the window circuit will also operate the triac. As with the series switching circuits, a low pass filter is provided in the shunt switching circuit in order to prevent nuisance tripping of the shunt switching circuit by the ringing signal. The shunt switching circuit may connect the two lines together directly or via a further component. For example the lines may be connected together via a distinctive termination, e.g. a diode and a Zener diode back-to-back so that the resistance of the term/nation is non-linear and polarity dependent.

The window circuit may be connected to the switching circuits by any of a number of means. For example, in one form of device, they may be connected by means by of an optoelectronic coupler. In other forms of device they may be DC coupled to the window circuit for example taking their actuating voltage from the voltage drop across a resistor in the window circuit.

Preferably all components of the arrangement take their power from the current in the lines or from the voltage drop between them so that no separate power supply rails are needed.

It is quite possible to produce a number of arrangements each having a different DC actuation voltage window so that they can be connected at various points along a long channel in order to divide the channel into sections for locating a fault.

BRIEF DESCRIPTION OF THE DRAWING

Three forms of arrangement according to the present invention will now be described by way of example with reference to the accompanying drawings in which.

DETAILED DESCRIPTION OF THE DRAWING

Referring to the accompanying drawings, a maintenance termination unit 1 for a telephone line comprises a pair of series switching circuits 2 and 2' located in each of the lines of a communication channel, each series switching circuit being controlled by means of a window circuit 3. The window circuit 3 also controls an overvoltage shunt switching circuit 4 that shunts any overvoltage across the load. In an alternative circuit it is possible for an earth connection to be provided, in which case the overvoltage circuit may be employed to shunt the overvoltage to earth.

In order to perform a maintenance test on the line, which may be a routine test or may be due to a subscriber complaint, a positive DC voltage of 80 to 100 V is first applied between the tip and ring lines, whereupon the shunt switching circuit 4 closes and connects the lines together. This enables a loop back test to be performed in which the overall line resistance can be measured. As soon as the applied voltage is removed the shunt switching circuit will open. Application of a negative voltage of between 80 and 100 V between the lines will cause the series switching circuits 2 to open, thereby isolating the subscriber from the line. The series switching circuits will remain open for a period of about 20 seconds after the voltage is removed allowing the line to line and line to ground resistances to be evaluated.

Figure 1:
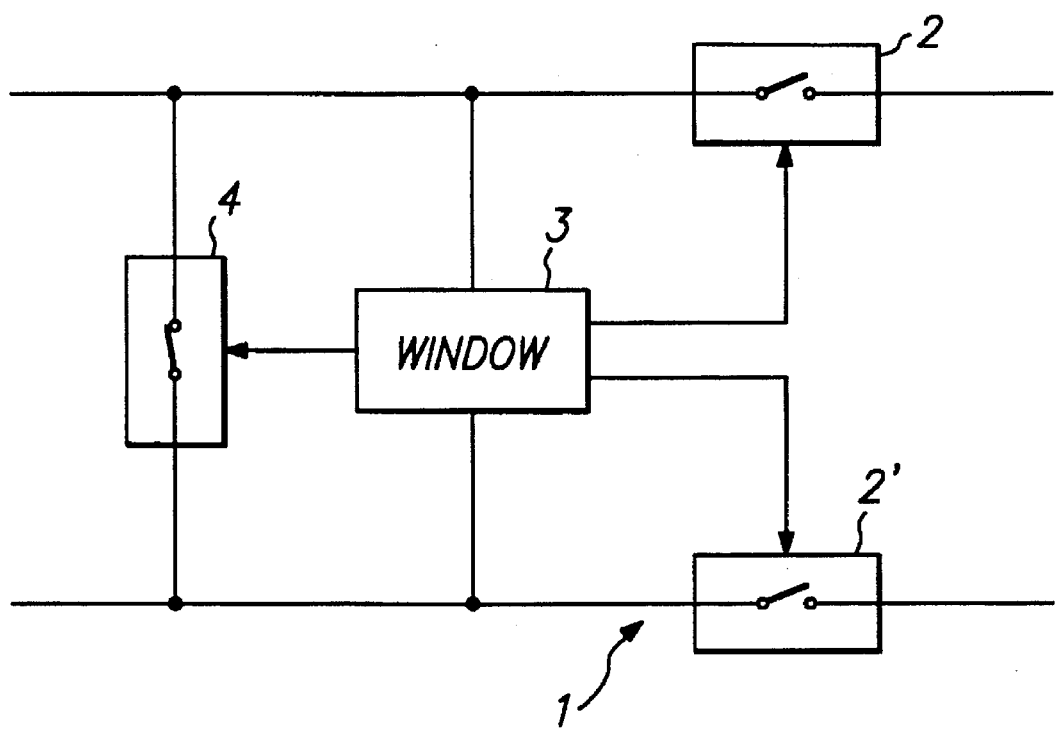
FIG. 1 is a block diagram indicating the main components of the arrangement according to the invention.
Figure 2:
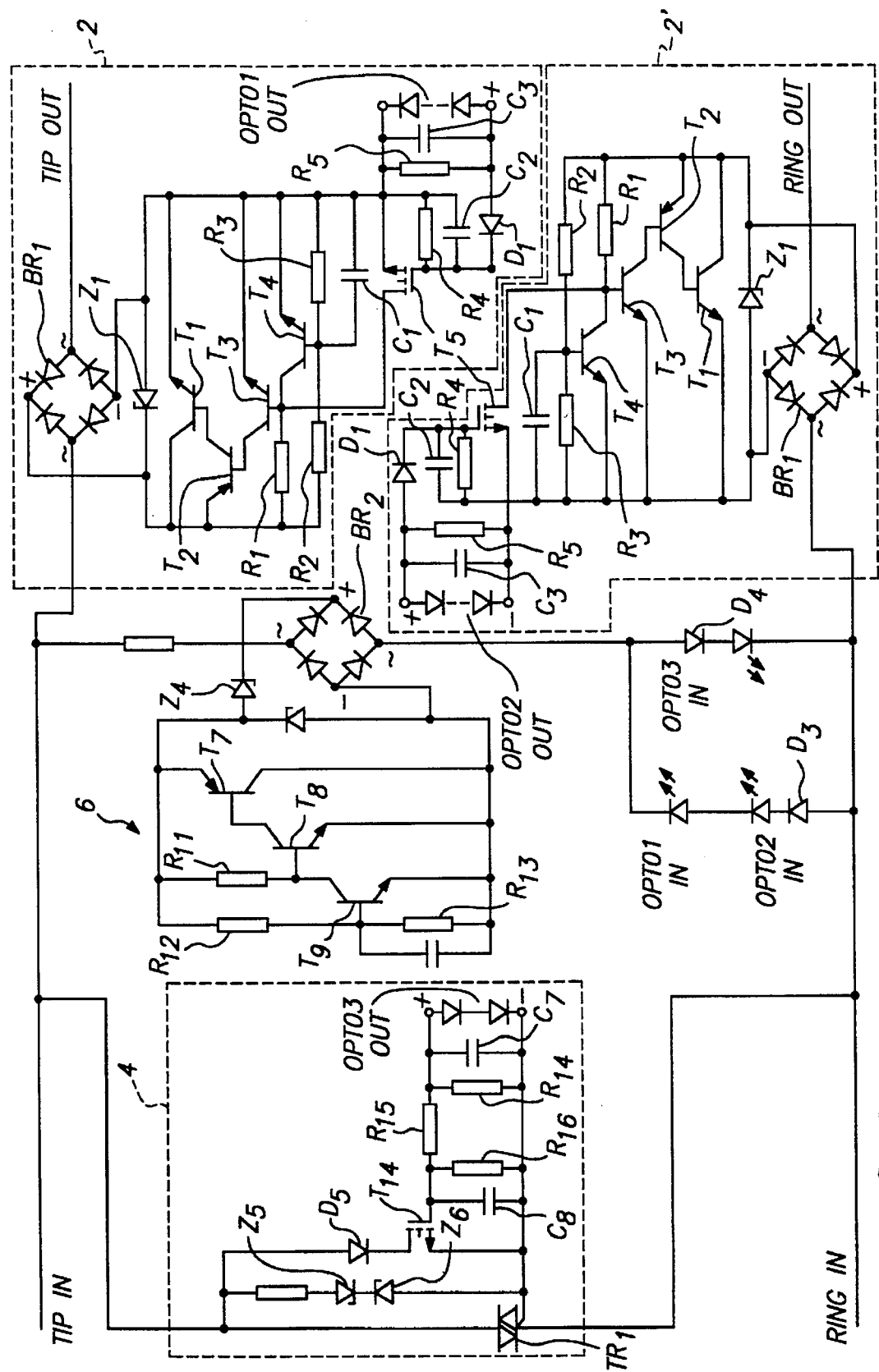
FIG. 2 is a circuit diagram of one form of an arrangement shown in FIG. 1.

The electrical circuit forming the MTU is shown in FIG. 2.

Each series switching circuit 2 and 2' comprises three transistors $T_1$, $T_2$ and $T_3$ in complementary darlington configuration that are series connected in the associated line within a diode bridge $BR_1$ and form a switching transistor. The base terminal of the darlington triplet is held in a potential divider formed by resistor $R_1$ and overcurrent control transistor $T_4$, the potential divider spanning the darlington triplet, and the base terminal of the control transistor $T_4$ is itself held in a potential divider formed by resistors $R_2$ and $R_3$ and also spans the darlington triplet switching transistor. This circuit will protect the system from an overcurrent in the tip or ring line as follows: As the voltage on the line increases from zero all the transistors will be off until the voltage across the circuit exceeds the voltage dropped across she diode bridge plus a single pn junction drop for the switching transistor. The switching transistor will then turn on to allow current to flow while control transistor $T_4$ remains off. If the current in the line increases, the base voltage of control transistor $T_4$ will increase due to the voltage drop across $R_3$ until transistor $T_4$ turns on when an overcurrent is experienced. This will cause the base-emitter terminals of the switching transistor to be shorted and the switching transistor to turn off, thereby blocking current flow in the line. In this state the leakage current will be determined by the values of $R_1$, $R_2$ and $R_3$ which will typically be in the range of 50 kΩ to 1 MΩ. A 100 nF capacitor $C_1$, is connected in parallel with resistor $R_3$ in order to inhibit switching on of transistor $T_1$. This will prevent tripping of the switching circuit by transient surge currents due to inductance and capacitance on the line when the system is first switched on. In addition, a Zener diode $Z_1$ is connected across transistor $T_1$ in order to protect the switching circuit 2 from voltages exceeding the transistors' operating voltages, for example, large inductive spikes.

In addition to the overcurrent control transistor $T_4$, an enhancement mode test control FET $T_5$ is connected between the base and emitter terminals of the switching transistor. The gate terminal of FET $T_5$ is connected to the window circuit so that the switching circuit can be switched on and off remotely.

The shunt switching circuit 4 comprises a triac $TR_1$ that is connected between the tip and ring lines and whose gate terminal is connected to the tip line via a pair of back-to-back Zener diodes $Z_5$ and $Z_6$ and gate current limiting resistor $R_{17}$. When an overvoltage is experienced that exceeds the breakdown voltage of Zener diodes $Z_5$ and $Z_6$ a current pulse will be transmitted to the gate of the triac causing the tip and ring lines to be shorted. An enhancement mode FET $T_{14}$ is also connected between the gate of triac $TR_1$ and the tip line in order to allow remote switching of the shunt switching circuit 4. A diode $D_5$ is included to provide reverse breakdown protection for FET $T_{14}$.

The window circuit comprises a voltage level detector Zener diode $Z_4$ and a current level detection circuit 6 that are connected in series within a diode bridge $BR_2$ which is itself connected between the tip and ring lines. The Zener diode $Z_4$ will allow current to flow through the window circuit only when the voltage across it is 75 V, corresponding to a voltage between the tip and ring lines of 80 V, while the current level detection circuit 6 will stop current flow through the window circuit at currents associated with a tip to ring voltage in excess of 100 V. The current level detection circuit 6 works on essentially the same principle as the series switching circuits 2 and 2'. A complementary darlington pair of transistors $T_7$ and $T_8$ form the switching transistor whose base terminal is held in a potential divider formed by 1 MΩ resistor $R_{11}$ and control transistor $T_9$ whose base terminal is itself held in a voltage divider formed by a pair of 1 MΩ resistors $R_{12}$ and $R_{13}$. When the voltage across transistor $T_7$ exceeds a pn junction drop, current will flow until the voltage across $R_{13}$ is sufficient to turn transistor $T_9$ on, whereupon the base emitter terminal of transistor $T_8$ is shorted and the darlington pair switches off.

Three opto-isolators OPTO1-3 are connected with their inputs in series with the voltage level detector Zener diode $Z_4$ and the current level detection circuit 6 and their outputs connected to the series and shunt switching circuits. Isolators OPTO1 and OPTO2 which are connected to the series switching circuits are in series with each other and in parallel with opto-isolator OPTO3 which is connected to the shunt switching circuit 4. The input of opto isolator OPTO3 is connected with opposite polarity to that of isolators OPTO1 and OPTO2 so that the series and the shunt switching circuits will be actuated with applied voltages of different polarity. Diodes $D_3$ and $D_4$ are included to prevent reverse breakdown of the LEDs in the opto-isolators caused by an application of a large reverse voltage.

When a DC signal of between 80 and 100 V with the correct polarity is applied to the tip and ring lines, a current of about 10 mA will flow through the LED inputs of the opto isolators OPTO1 and OPTO2. The output of each opto-isolator is passed through a low pass RC filter formed from resistor $R_5$ and capacitor $C_3$ which prevents spurious triggering of the switching circuits, and charges capacitor $C_2$ which is connected between the gate and source of test control FET $T_5$. Diode $D_1$ allows current to flow from OPTO1 into the capacitor but not the other way round, so that the discharge of capacitor $C_1$ is controlled by resistor $R_4$ also connected between the gate and source of FET T5.

Thus once capacitor $C_2$ has charged sufficiently to exceed the gate voltage of the test control FET $T_5$ the series switching circuit will open to disconnect the subscriber, and will remain open after removal of the actuating DC signal until capacitor $C_2$ has discharged through resistor $R_4$.

If the polarity of the applied DC signal is reversed, a 10 mA current will flow through the LED of opto-isolator OPTO3. The output voltage is passed through a low pass RC filter formed by resistors $R_{14}$, $R_{15}$, $R_{16}$, $C_7$ and $C_8$ and then to the gate of FET $T_{14}$, which will turn the FET on and trigger the triac effectively shorting the two lines together and allowing loop-back testing of the system.

The arrangement may even be employed where the fault is a short circuit in the subscriber's equipment. In such a case any voltage applied at the exchange will be dropped along the line so that it will not be possible to apply the required actuating voltage to the window circuit. If, however, the applied voltage is reduced to below about 3.6 V, the voltage drop occurring across the switching transistor of each series switch will be insufficient to maintain the switch closed and the fault can thus be sectionalized.

Figure 3A:
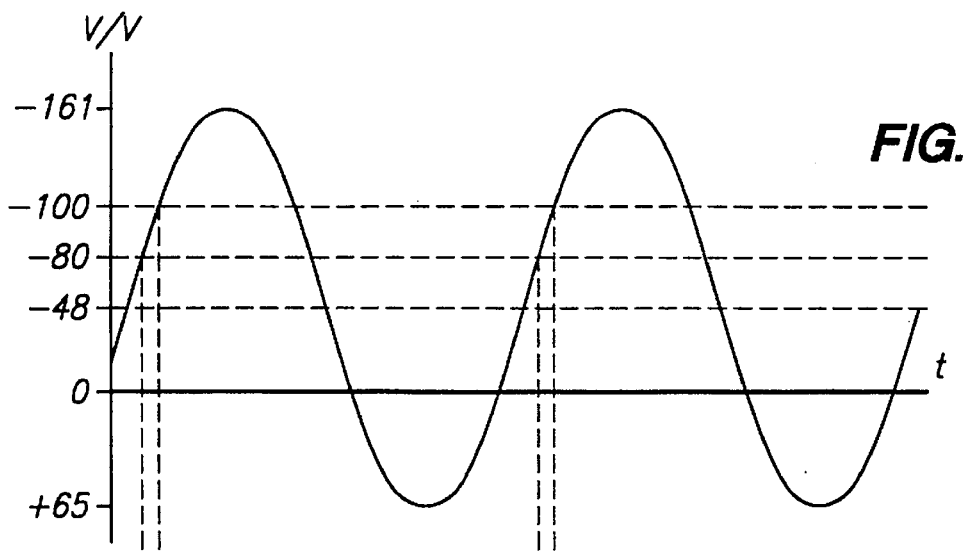
FIGS. 3a, 3b and 3c are graphs showing the line voltage and the window circuit output voltage of the arrangement shown in FIG. 2 during a ringing signal.
Figure 3B:
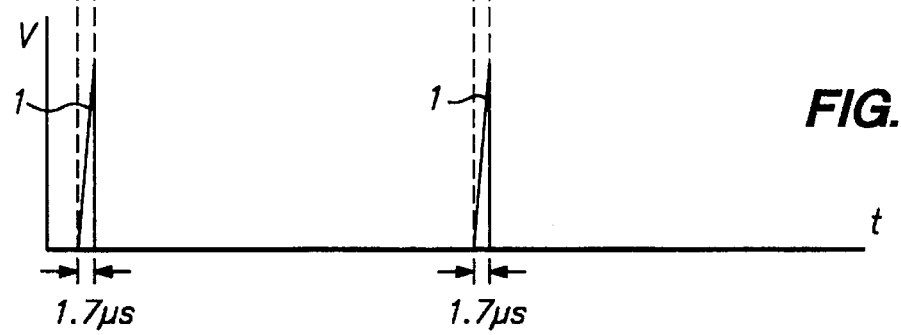
Figure 3C:

Spurious triggering of the shunt and series switching circuits due to the ringing signal on the lines is prevented as shown in FIG. 3. FIG. 3a shows the voltage appearing on the tip and ring lines when a ringing signal is transmitted. The signal comprise a sinusoidal ringing signal of 20 Hz frequency and 80 V RMS amplitude (226 V p-p) superimposed on a battery voltage of –48 V. Although the instantaneous voltage on the line exceeds the testing voltage for a considerable period of time, the only time current is generated in the window circuit 3 is when the voltage on the lines is between 80 and 100 V on the rising edge of the ringing signal. FIG. 3b shows the input to the opto-isolators (line 1). This consists of a train of pulses of about 1.7 ms width and occurring once per ringing cycle. The output from the (open ended) opto-isolaters is shown as line 2 in FIG. 3c (in which the scale has been expanded) together with the input to the opto-isolators (line 1). This output starts to rise when the LED current has risen to about 5 mA. Pulses can easily be filtered out by means of the RC filters formed by $C_3$ and $R_5$ in the series switching circuits and by $C_7$, $C_8$, $R_{14}$, $R_{15}$ and $R_{16}$ in the shunt switching circuit. Usually the filters will have a cut-off point of at least 50 Hz, but normally not more than 500 Hz.

Figure 4:
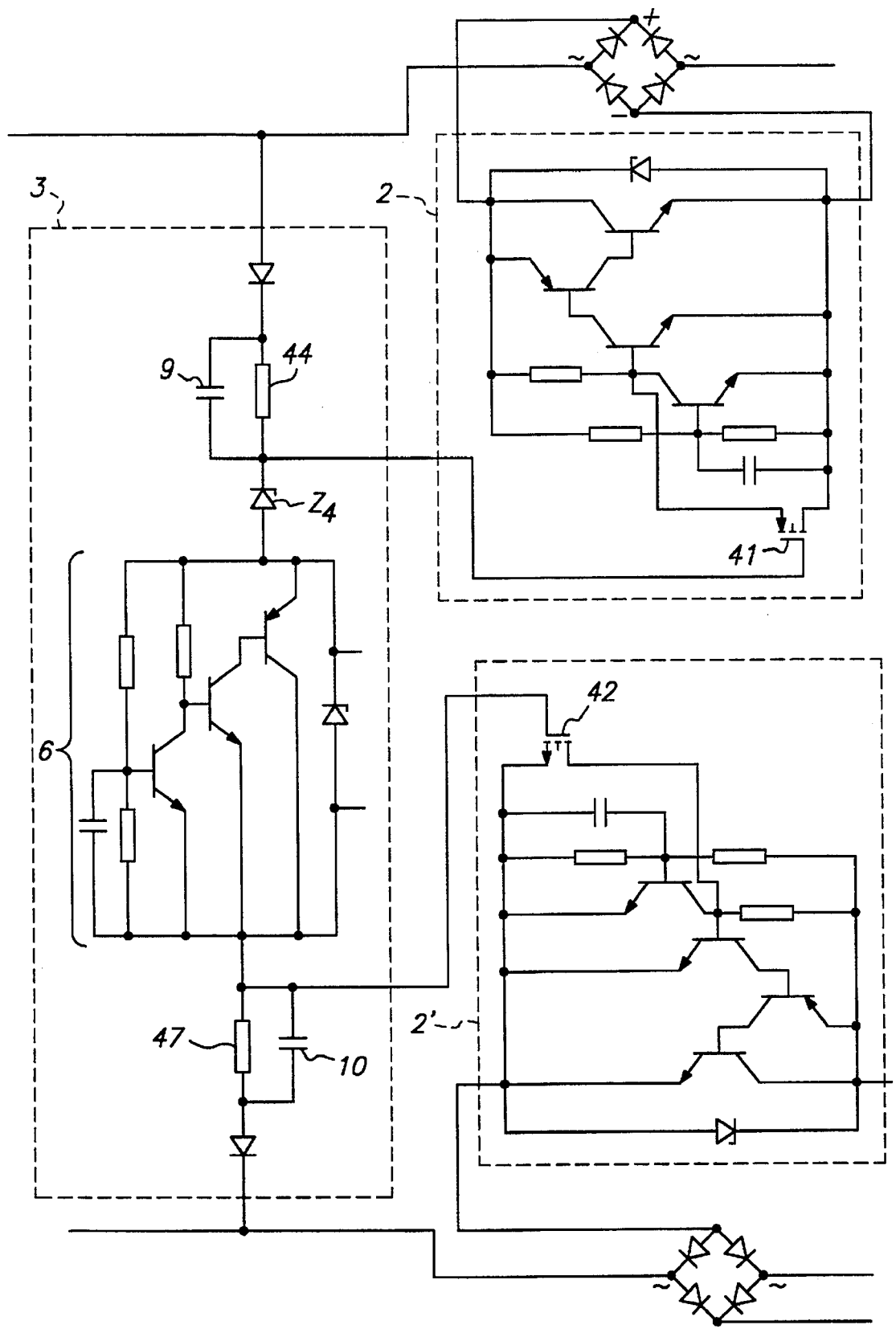
FIG. 4 is a circuit diagram of a second form of arrangement.

FIG. 4 shows an alternative form of arrangement in which the window circuit is directly coupled to the series switching circuits. The series switching circuits 2 and 2' are largely the same as those shown in FIG. 2, as is the combination the current level detection circuit 6 and Zener diode $Z_4$ for determining the voltage window that will actuate the switches.

Series switching circuit 2 includes a p-channel enhancement mode FET41, while switching circuit 2' includes an n-channel enhancement mode FET42 as test control elements.

The window circuit includes a pair of resistors 44 and 47 from which points the gate voltages of FETs 1 and 2 are derived. Capacitors 9 and 10 are connected in parallel with resistors 44 and 47 in order to filter out any short spurious signals and also so that they will charge up on receipt of the correct test voltage and hold FETs 41 and 42 open for a period of time after termination of the d.c actuating signal. Steering diodes are provided to prevent reverse system voltages affecting the two FETs 41 and 42.

When a test voltage signal is received, current will flow through the window circuit 3 and a voltage drop will develop across resistors 44 and 47, making the gate of FET 41 more negative than its source, and the gate of FET 42 more positive than its source, thereby opening the switching circuits 2 and 2'.

A similar additional window circuit of opposite polarity may be provided in order to control a shunt switching circuit.

Figure 5:
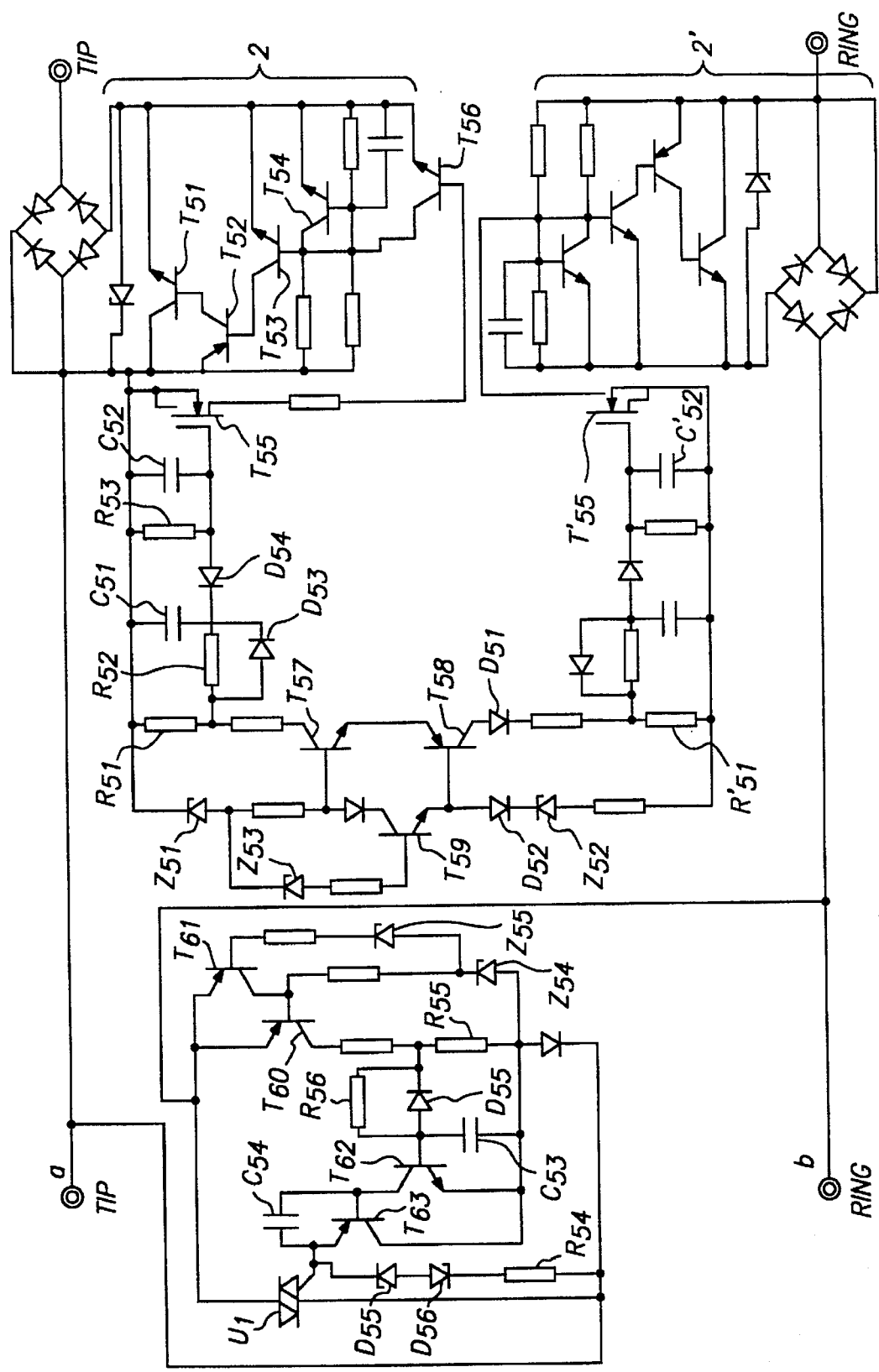
FIG. 5 is a circuit diagram of a third form of arrangement.

A preferred electrical circuit for forming the MTU is shown in FIG. 5. The circuit comprises a pair of series switching circuits 2 and 2' that are controlled by a window circuit 3, as in the circuits described above, and a separate shunt switching circuit 4.

The series switching circuits 2 and 2' are largely the same as those shown in FIGS. 2 and 4. Switching circuit 2 comprises three transistors $T_{51}$, $T_{52}$ and $T_{53}$ in complementary darlington configuration that form a series switching transistor and are controlled by an overcurrent control transistor $T_{54}$ and a test control transistor $T_{55}$. The main difference is that a further transistor $T_{56}$ is included between the test control transistor $T_{55}$ and the series switching transistor in switching circuit 2 in order to prevent the gate-source junction of the test control transistor $T_{55}$ being reverse biased by more than its breakdown voltage when the switch is opened.

The window detector circuit comprises an NPN bipoplar transistor $T_{57}$ and a PNP transistor $T_{58}$ connected in a push-pull configuration between the lines. Base current for the transistors is provided through 38 V Zener diodes $Z_{51}$ and $Z_{52}$ so that current will flow through the window circuit only when the voltage across the lines is at least 75 V. In addition, a further transistor $T_{59}$ that is connected between the bases of the push-pull transistors $T_{57}$ and $T_{58}$ receives its base current from the anode of Zener diode $Z_{51}$ via a further 10 V Zener diode $Z_{53}$. Transistor $T_{59}$ will switch the current in the window circuit off when the voltage across the lines is increased by a further 15 V to –90 V. Diodes $D_{51}$ and $D_{52}$ are included to prevent any current flowing in the reverse direction.

The current flowing through the window circuit develops a voltage across resistor $R_{51}$ and this signal is passed to the test control transistor $T_{55}$ via a low pass filter formed from capacitor $C_{51}$, resistor $R_{52}$ and diode $D_{53}$ in parallel with $R_{52}$. When the unit is subjected to a ringing signal a train of unipolar pulses of short duration is developed across resistor $R_{51}$. In contrast with the arrangements described in FIGS. 2 and, 4, however, pulses are generated on the falling slope of the ringing signal in addition to the rising slope. The purpose of diode $D_{53}$ is to enable capacitor $C_{51}$ to discharge faster than it is charged when the low pass filter is subjected to this train of pulses and so limit the voltage developed across capacitor $C_{51}$ to 0.7 V. A timing capacitor $C_{52}$ and resistor $R_{53}$ are connected across the source gate junction of the test control transistor $T_{55}$ and separated from the low pass filter by diode $D_{54}$ which allows the timing capacitor to charge but limits the discharge path to resistor $R_{53}$. An equivalent filter and timing circuit is provided to take the signal developed across resistor $R'_{51}$ of the window circuit to test control transistor $T'_{55}$ of the switching circuit 2'.

The shunt switching circuit comprises a triac U1 that is connected between the a and b lines whose gate is connected to the a line via back-to-back Zener diodes $D_{55}$ and $D_{56}$ and current limiting resistor $R_{54}$ in order to provide overvoltage protection against transients, etc., that exceed the Zener voltages. The test switching circuit comprises a PNP transistor $T_{60}$ that can be turned on when the applied voltage exceeds the Zener voltage of Zener diode Z54 (75 V). A further PNP transistor $T_{61}$ will short the base-emitter junction of transistor $T_{60}$ and so turn it off when the applied voltage exceeds the combined Zener voltages of Zener diode $Z_{54}$ and a further 15 V Zener diode $Z_{55}$ connected to the base of transistor $T_{61}$. Thus an applied voltage of +75 V to +90 V will cause current to flow through transistor T60 and a voltage to be developed across resistor $R_{55}$. This signal is filtered by a low pass filter formed from capacitor $C_{53}$, resistor $R_{56}$ and diode $D_{55}$ in order to prevent false triggering of the shunt switch. The voltage appears at the base of transistor $T_{62}$ which turns transistors $T_{62}$ and $T_{63}$ on and fires the triac U1. Capacitor $C_{54}$ is included in the circuit to prevent leakage current briefly turning on transistor $T_{63}$, which would cause the triac to turn on, when the exchange battery voltage is initially connected to the circuit.

The triac used in the circuit should have a maximum gate and hold current of 5 mA. This affects the maximum value of line resistance that can be measured as higher values will prevent the triac from latching on. If the window voltage is 75 V to 90 V, and the activation voltage is 90 V, then this 90 V may drop by 15 V, due to resistance in the line, for the triac switch to still operate. This equates to a maximum line resistance that can be measured of 15 V/5 mA=3 KΩ

Subscriber disconnection may be performed by applying a voltage of between –75 V and –90 V to the line to open the two series switches 2 and 2'. The switches will remain open for a period that is determined by the values of the timing capacitor $C_{52}$ and resistor $R_{53}$ in order to enable the various line tests to be performed. Reversing the polarity of the voltage to +75 V to +90 V will trigger the shunt switching circuit and enable a loop back test to be performed. The loop resistance is measured by reducing the test voltage to 50 V, without breaking the loop, and measuring the current flowing in the circuit. As soon as current flow through the triac is removed, caused by removal of the test voltage, the shunt switch of the MTU will reset to normal operation.

Figure 6A:
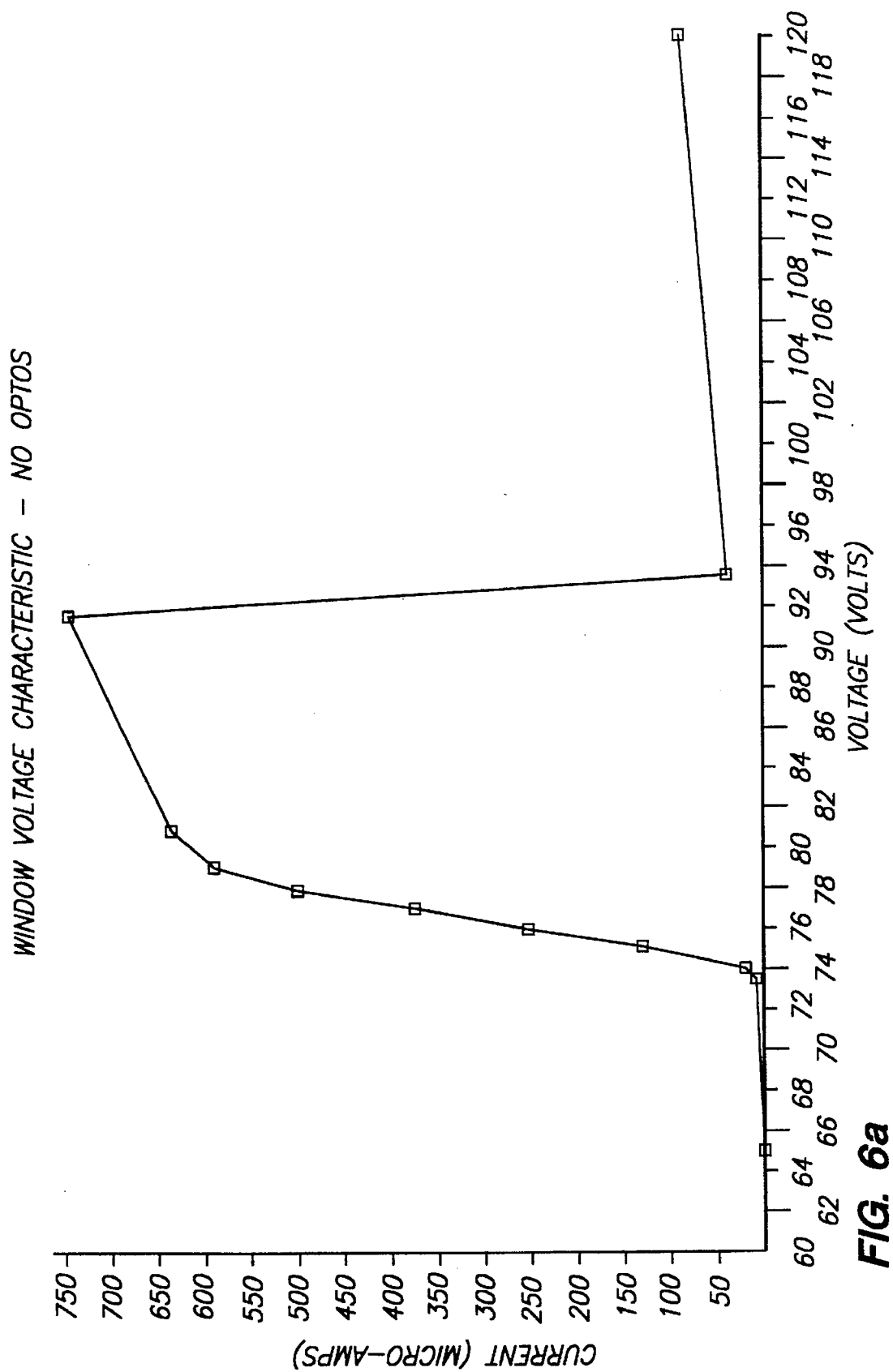
FIGS. 6A and 6B are graphs showing the I–V curves of the window circuits of the arrangements shown in FIGS. 2 and 5.
Figure 6B:
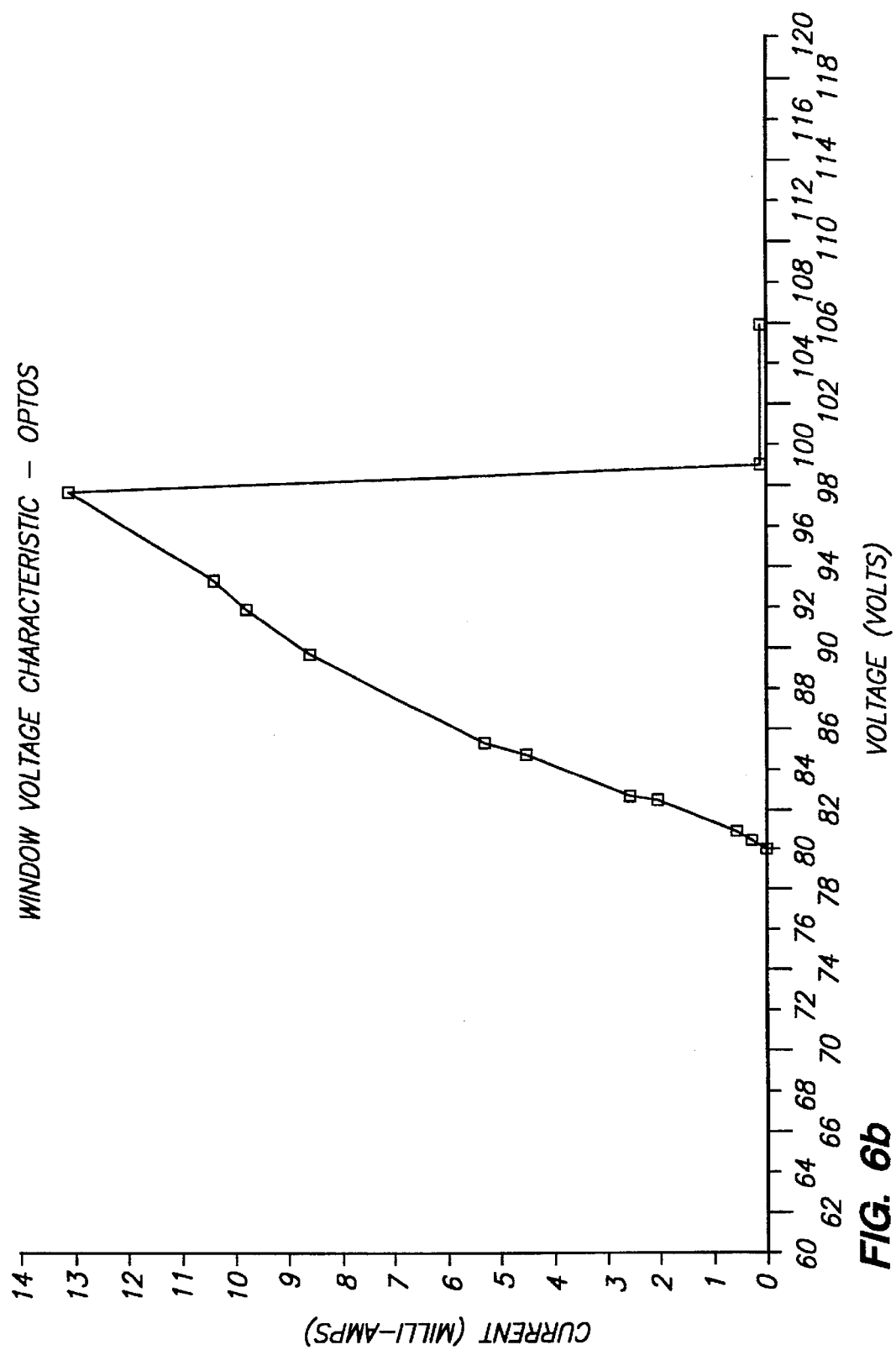

The circuit has the advantage that the initial slope of the I-V curve of the window circuit is much steeper as shown in FIG. 6 (curve A) as compared with that of the unit shown in FIG. 2 (curve B), thereby giving a precise voltage at which the series switches open. As can be seen, with curve B the particular point at which the window circuit current has risen to a value to open the switches is not clear. The increased slope of curve A at the turn-on voltage (75 V) is due to amplification of the current of Zener diodes $Z_{51}$ and $Z_{52}$ by transistors $T_{57}$ and $T_{58}$. In addition the current variation within the voltage window of –75 V to –90 V is reduced with the result that variations in the charge held by the timing capacitors $C_{52}$ and $C'_{52}$ and consequently the periods for which the series switches are held open are also reduced.

In some circumstances, a window voltage range higher than that given above, for example a window between 110 V and 130 V (regarded as a "window voltage" of 120 V, i.e. about the mid-point) might be useful. This would allow testing to be carried out at, say, 100 V (i.e. about 10–20 V less than the window voltage depending on the width of the window), and as a result any line noise (perhaps about 1 V) would give rise to a reduced percentage error. It may be noted that prior art to Om Ahuja involves measurements at 10 V where line noise could give rise to an unacceptably large percentage error. It was previously thought impossible to measure high impedances at low voltages due to the problem of noise.

Current leakage in the off-state below the lower of the window voltages (namely below 110 V in the preferred range above) might be, say, 1–3 micro amps, whereas in the off-state above that range, i.e. above 130 V, it might be about 100 micro amps, increasing with voltage. For this reason a higher window voltage might be desirable, since a higher test voltage can be used whilst still suffering the smaller leakage current. A window voltage of about 120 V might therefore be preferred to that of about 85 V (range 75–90 V) indicated earlier in the specification, for a test voltage of about 100 V.

We claim:

1. A switching arrangement which:
   A. can be connected in a communications channel, the communications channel comprising a pair of lines;
   B. in use, is connected between sets of terminal equipment; and
   C. comprises:
      (i) a DC voltage window detector circuit which, in use, is connected between the lines and is responsive to a voltage between the lines;
      (ii) a series switching circuit, which:
         (a) in use, is connected in one of the lines,
         (b) is in a closed state when it is not actuated, and
         (c) will switch to an open state when it is actuated; and
      (iii) a low pass filter which is associated with the switching circuit;
   wherein the DC voltage window detector circuit will actuate the switching circuit when the DC voltage between the lines is within a first predetermined band, but will not actuate the switching circuit when the DC voltage between the lines is not within the first predetermined band, so that the switching circuit can be remotely actuated by means of a DC signal on the channel; and the low pass filter has a cut-off frequency which is sufficiently low to prevent the switching circuit from being actuated by a ringing signal on the channel.

2. An arrangement as claimed in claim 1, wherein the window detector circuit includes a Zener diode which sets the lower limit of the first predetermined voltage band.

3. An arrangement as claimed in claim 1, which includes a series switching circuit connected in each of the lines.

4. An arrangement as claimed in claim 1, wherein the series switching circuit will open when subjected to an overcurrent in the line.

5. An arrangement as claimed in claim 4, wherein the series switching circuit comprises a switching transistor which is selected from bipolar transistors and field effect transistors and which (a) if it is a bipolar transistor comprises a collector, an emitter and a base, and (b) if it is a field effect transistor comprises a drain, a source and a gate, and whose base or gate voltage is controlled by an overcurrent control element, the overcurrent control element switching on when the series switching circuit is subjected to an overcurrent, thereby switching the switching transistor off and switching the series switching circuit to the open state.

6. An arrangement as claimed in claim 5, wherein the series switching circuit includes a test control element which also controls the base or gate voltage of the switching transistor, the test control element turning on when actuated by the window detector circuit, thereby switching the switching transistor off and switching the series switching circuit to the open state.

7. An arrangement as claimed in claim 1, wherein the series switching circuit is capable of remaining in the open state for a period of time after termination of the actuating DC signal.

8. An arrangement as claimed in claim 7, wherein the series switching circuit includes a capacitor connected to an input terminal of the test control element, the capacitor being charged during actuation of the switching circuit by the window detector circuit and holding the switching circuit open for a period of time after termination of the actuating DC signal.

9. An arrangement as claimed in claim 1, which includes:
   A. a shunt switching circuit which:
      i. in use is connected:
         (a) between the lines; or
         (b) between one of the lines and ground;
      ii. is in an open state when it is not actuated; and
      iii. will switch to o closed state when it is actuated; and
   B. a low pass filter associated with the shunt switching circuit;
   wherein the DC voltage window detector circuit will actuate the shunt switching circuit when the DC voltage between the lines is within a second predetermined band, but will not actuate the shunt switching circuit when the DC voltage between the lines is riot within the second predetermined band, so that the shunt switching circuit can be remotely actuated by means of a DC signal on the channel; and the low pass filter associated with the shunt switching circuit has a cut-off frequency which is sufficiently low to prevent the shunt switching circuit from being actuated by a ringing signal on the channel.

10. An arrangement as claimed in claim 9, wherein the shunt switching circuit will close when subjected to an overvoltage.

11. An arrangement as claimed in claim 9, wherein the shunt switching circuit comprises a triac.

12. An arrangement as claimed in claim 11, wherein the triac has a gate which is connected to the window detector circuit, so that the window detector circuit will actuate the triac when the DC voltage is within the second predetermined band.

13. An arrangement as claimed in claim 9, wherein the window detector circuit is connected to the shunt switching circuit via an optoelectronic coupler.

14. An arrangement as claimed in claim 1, wherein the window detector circuit is connected to the switching circuit via an optoelectronic coupler.

15. A switching arrangement which:
   A. can be connected in a communications channel, the communications channel comprising a pair of lines;
   B. in use, is connected between sets of terminal equipment; and
   C. comprises:
      (i) a DC voltage window detector circuit which, in use, is connected between the lines, which is responsive to a voltage between the lines;
      (ii) a first series switching circuit which, in use, is, connected in one of the lines, which
         (a) is in a closed state when it is not actuated, and
         (b) will switch to an open state when it is actuated;
      (iii) a second series switching circuit which, in use, is connected in the other of the lines, which
         (a) is in a closed state when it is not actuated, and
         (b) will switch to an open state when it is actuated;
      (iv) a shunt switching circuit which, in use, is connected between the lines, which
         (a) is in an open state when it is not actuated, and
         (b) will switch to a closed state when it is actuated; and
      (v) a low pass filter associated with the switching circuits;

wherein the DC voltage window detector circuit will actuate the series switching circuits when the DC voltage between the lines is within a first predetermined band, and will actuate the shunt switching circuit when the DC voltage between the lines is within a second predetermined band, but will not actuate the series switching circuits when the DC voltage between the lines is not within the first predetermined band, and will not actuate the shunt switching circuits when the DC voltage between the lines is not within the second predetermined band, so that the switching circuits can be remotely actuated by means of a DC signal on the channel; and the low pass filter has a cut-off frequency which is sufficiently low to prevent the switching circuits from being actuated by a ringing signal on the channel.

16. A communications circuit comprising:
   A. a communications channel comprising a pair of lines; and
   B. a switching arrangement, connected in the channel between sets of terminal equipment, comprising:
      (i) a DC voltage window detector circuit, connected between the lines, which is responsive to a voltage between the lines;
      (ii) a first series switching circuit, connected in one of the lines, which
         (a) is in a closed state when it is not actuated, and
         (b) will switch to an open state when it is actuated;
      (iii) a second series switching circuit, connected in the other of the lines, which
         (a) is in a closed state when it is not actuated, and
         (b) will switch to an open state when it is actuated;
      (iv) a shunt switching circuit, connected between the lines, which
         (a) is in an open state when it is not actuated, and
         (b) will switch to a closed state when it is actuated; and
      (v) a low pass filter associated with the switching circuits;

wherein the DC voltage window detector circuit will actuate the series switching circuits when the DC voltage between the lines is within a first predetermined band, and will actuate the shunt switching circuit when the DC voltage between the lines is within a second predetermined band, but will not actuate the series switching circuits when the DC voltage between the lines is not within the first predetermined band, and will not actuate the shunt switching circuits when the DC voltage between the lines is not within the second predetermined band, so that the switching circuits can be remotely actuated by means of a DC signal on the channel; and the low pass filter has a cut-off frequency which is sufficiently low to prevent the switching circuits from being actuated by a ringing signal on the channel.

* * * * *